United States Patent
Bailey et al.

(10) Patent No.: US 8,370,843 B1
(45) Date of Patent: Feb. 5, 2013

(54) METHOD, PROGRAM PRODUCT AND COMPUTER SYSTEM FOR PROGRESSIVE IMPROVEMENT OF AN ENVIRONMENT POOL

(75) Inventors: Michael Casson Bailey, Winchester (GB); Timothy William Banks, Winchester (GB); Ian Geoffrey Redding, Winchester (GB); Dennis J Zimmer, Eastleigh (GB)

(73) Assignee: International Business Machines Corporation, Armonk, NY (US)

( * ) Notice: Subject to any disclaimer, the term of this patent is extended or adjusted under 35 U.S.C. 154(b) by 2935 days.

(21) Appl. No.: 09/628,367

(22) Filed: Jul. 31, 2000

(51) Int. Cl.
*G06F 9/455* (2006.01)
*G06F 9/46* (2006.01)

(52) U.S. Cl. ............................................ 718/104; 718/1

(58) Field of Classification Search ................. 709/100, 709/101; 719/300–332; 707/103; 718/100–108; 717/168–173
See application file for complete search history.

(56) References Cited

U.S. PATENT DOCUMENTS

| | | | | |
|---|---|---|---|---|
| 5,345,588 A * | 9/1994 | Greenwood et al. | ........... | 709/107 |
| 5,379,431 A * | 1/1995 | Lemon et al. | .................... | 710/10 |
| 5,402,513 A * | 3/1995 | Schafer | ......................... | 382/298 |
| 5,896,531 A * | 4/1999 | Curtis et al. | .................. | 709/104 |
| 6,105,074 A * | 8/2000 | Yokote | .......................... | 719/328 |
| 6,430,600 B1 * | 8/2002 | Yokote | .......................... | 709/203 |
| 6,448,981 B1 * | 9/2002 | Kaczmarski | .................. | 345/763 |
| 6,636,964 B1 * | 10/2003 | Okamura | ......................... | 713/2 |

* cited by examiner

*Primary Examiner* — Lewis A Bullock, Jr.
*Assistant Examiner* — Mark Gooray
(74) *Attorney, Agent, or Firm* — Winstead, P.C.

(57) ABSTRACT

Disclosed are a method, system and computer program product for progressively improving the fit of a pool of reusable environments to requirements of programs in a computer system. The method comprises steps of: providing a first environment for a first program; responsive to initiation of a second program, making a determination whether creation of a new environment is a best response; responsive to a determination that creation of a new environment is a best response, creating a new environment for the second program; responsive to a determination that creating a new environment is not a best response, testing the pool for a best fit environment; and adding elements to the best fit environment to match requirements of the second program, unless the best fit environment already matches the requirements of the second program.

10 Claims, 2 Drawing Sheets

METHOD, PROGRAM PRODUCT AND COMPUTER SYSTEM FOR PROGRESSIVE IMPROVEMENT OF AN ENVIRONMENT POOL

FIELD OF THE INVENTION

The present invention relates to the provision of preinitialized environments to support multiple programs executing in a computer system with a reduction in program task initialization time.

BACKGROUND OF THE INVENTION

In computer systems, it is well known in the art to have multiple programs and instances of the same program running at the same time. Indeed, many of the problems and difficulties of managing modern systems have come about precisely because the information technology world has advanced since the days of dedicated batch processing systems in which only a single computing task could be executed at any given time.

One problem that is particularly acute in modern systems is the impact on performance of initializing runtime environments.

Various approaches have been taken to provide a solution to this problem. One example is that described in U.S. Pat. No. 5,896,531 to Curtis et al., in which it is proposed to retain environments that have been initialized to form a pool of environments for future use. In the model proposed by Curtis et al., a second application program's initiation causes the system to examine existing environments for possible reuse if one of them should prove to meet the minimal requirements of the newly-initiated program. Should an examined environment prove not to meet the minimal requirements, it is discarded from the set of existing environments.

The minimal requirements disclosed in Curtis et al. are a set of the parameters required by object-oriented programs for their execution in an object-oriented program system.

In a system as proposed by Curtis et al., a trade-off is found between the saving of initialization time by keeping environments for reuse and the consumption of storage by the system because of the number of preinitialized environments that are in memory at any time. The trade-off is achieved by the expedient of discarding preinitialized environments that are found not to fit the second application's minimal requirements.

In such a system, there is an element of wastage, in that environments are discarded which might in time have proven to be useful for subsequent application programs to reuse. Further, the use of environments from the environment pool is limited to those environments which meet the minimal requirements of the second or subsequent application.

It is desirable to mitigate these problems by finding some more economical way to control the reuse of environments in a system in which multiple programs and instances of programs may coexist.

SUMMARY OF THE INVENTION

Accordingly, in a first aspect, the present invention provides a method for progressively improving a fit of a pool of reusable environments to requirements of programs in a computer system, the method comprising steps of: providing a first environment for a first program; responsive to initiation of a second program, making a determination whether creation of a new environment is a best response; responsive to a determination that creation of a new environment is a best response, creating a new environment for the second program; responsive to a determination that creating a new environment is not a best response, testing the pool for a best fit environment; and adding elements to the best fit environment to match requirements of the second program, unless the best fit environment already matches the requirements of the second program.

Preferably, at least one of the first, new and best fit environments is an execution environment. Preferably, the execution environment is preinitialized.

Preferably at least one of the first, new and best fit environments is eligible to be deleted. Further preferably, at least one least recently used of the first, new and best fit environments is eligible to be deleted.

Preferably, the elements are parameters of at least one of the first, the new and the best fit environments.

The step of responsive to initiation of a second program, making a determination whether creation of a new environment is a best response preferably comprises testing whether the pool has reached a maximum size. Further preferably, the step of responsive to a determination that the pool has reached its maximum size, testing the pool for a best fit environment comprises a programmatically alterable test.

In a second aspect, the present invention provides a computer program product comprising computer program code tangibly embodied in a signal-bearing medium, for, when loaded into a computer system and executed, progressively improving a fit of a pool of reusable environments to requirements of programs in a computer system, by causing the computer system to perform the steps of a method according to the first aspect. The signal bearing medium is preferably at least one of a transmissive medium and a storage medium.

In a third aspect, the present invention provides a computer system for progressively improving a fit of a pool of reusable environments to requirements of programs in a computer system, the computer system comprising: means for providing a first environment for a first program; means responsive to initiation of a second program, for making a determination whether creation of a new environment is a best response; means responsive to a determination that creation of a new environment is a best response, for creating a new environment for the second program; means responsive to a determination that creating a new environment is not a best response, for testing the pool for a best fit environment; and means for adding elements to the best fit environment to match requirements of the second program, unless the best fit environment already matches the requirements of the second program.

The preferred features of the means of the third aspect correspond to the preferred features of the steps of a method according to the first aspect.

It is known in the programming art to use preinitialized environments when an environment, such as an execution environment for a program, is expensive (in system time and resource consumption) to build, and there is a performance benefit to be gained by preserving the environment and reusing it for subsequent requests. In preferred embodiments of the present invention, several instances of a preinitialized environment can be made, different from each other depending on which program was loaded and executed in each.

In a preferred embodiment of the present invention, parameters are passed to the allocator of environments, which parameters are used to select the most appropriate environment. If a new environment is created, the matching parameters are saved with it. When selecting an environment to allocate, the allocator chooses an environment with matching parameters. If the allocator is obliged to choose an environment which does not match, it adds the matching parameters to the set for that environment, as the environment will then acquire the resources that those parameters describe, and so it will be a better match in future, providing that future programs require that set of parameters or a subset thereof.

When an environment has aged, the system may preferably destroy it, so allowing the requests profile to change over time, and the preinitialized environments to follow.

Preinitialized environments grow as they acquire resources. There may be advantages to keeping them as small as possible, and this can be achieved by using them for the same purpose as much as possible, and reducing the likelihood of all environments being used for all purposes. The method of the preferred embodiment of the present invention is advantageously flexible in allowing the system to learn the kinds of environments needed and reuse them efficiently.

A further advantage of the preferred embodiment of the present invention and its preferred features is that the pool of preinitialized environments is capable of more purposeful and less wasteful change than the prior art environments, in that environments that are not optimal are given further chances to become so. Furthermore, as a workload changes over time, the preferred embodiment of the present invention and its preferred features permit the corresponding adaptation and readaptation of the pool.

An additional advantage of the preferred embodiment of the present invention and its preferred features is in the programmably adaptable nature of the matching algorithms that can be used. This allows a system programmer, for example, to adjust the criteria on which a best-fit judgement will be made.

BRIEF DESCRIPTION OF THE DRAWINGS

A preferred embodiment of the invention will now be described by way of example only, with reference to the accompanying drawings, in which.

DETAILED DESCRIPTION OF THE INVENTION

Figure 1:
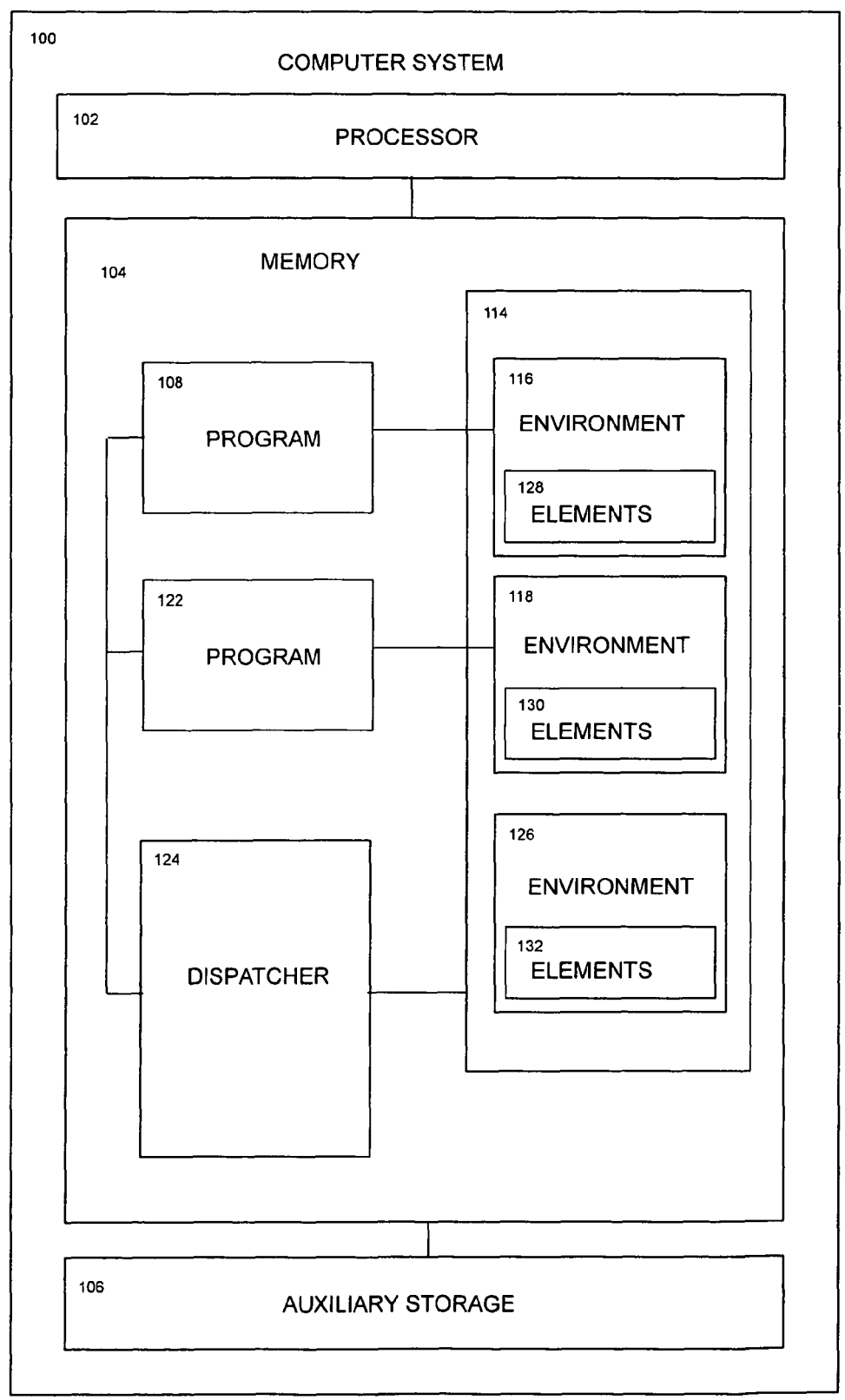
FIG. 1 shows a computer system suitable to be used as a preferred embodiment of the present invention.

In FIG. 1 there is shown a computer system (100), having a processor (102), a memory (104) and auxiliary storage (106) which may comprise magnetic storage, optical storage or the like. As a program (108) is initiated, one of environments (116, 118) it requires is instantiated in memory (104). As is well known to those skilled in the art, programs and data may be paged into and out of memory (104) into storage (106) during processing, but in this description, these environments will be referenced as if they remained in memory (104).

Within memory (104) are shown a program (108) and a pool (114) which may contain preinitialized environments (116, 118). In the case of a first initiation of a program (108), typically there are no environments available, and the first program must bear the cost of initialization of an environment. In the case of a second or subsequent program (122), there may be preinitialized environments. In a preferred embodiment, a dispatcher (124) is the subsystem of the system which allocates environments for use by programs. Dispatcher (124) may be programmed, for example, to offer preinitialized environments for reuse by any second or subsequent program (122). In a preferred embodiment, earlier programs are forced, in circumstances to be described in the description of the method below, by dispatcher (124) to accept an altruistic role so long as there is room in the pool (114) for a new environment (126). In this way, a subset of the earlier programs must bear the cost in performance and system resource use of initializing environments, for the benefit of later programs or instances of programs. This altruistic behavior allows the system to build up a pool (114) of environments which is conveniently sized to optimize the consumption of resources within the system, while offering programs an increased chance that there will be a suitable environment, or one that can be made suitable by addition to the set of elements (128, 130, 132)) contained in an environment. In one embodiment, elements (128, 130, 132) are parameters representing resources available to the program, but those skilled in the art will understand that they could equally well be other environment elements such as program control settings.

The preferred embodiment of the present invention is as a subsystem within a CICS Transaction Server (CICS is a registered trademark of IBM Corporation). In the preferred embodiment, the environments that form the pool are specialized open Task Control Blocks (open TCBs) that are able to provide the enclave (or task runtime language environment) for instances of applications within the system. These open TCBs are reserved for use by Java (Java is a registered trademark of Sun Microsystems, Inc.) program objects within the system, and are limited in number in order to keep system resource usage within control. The CICS Dispatcher acts as the allocator of environments to act as runtime language environments for use by the Java program objects.

Figure 2:
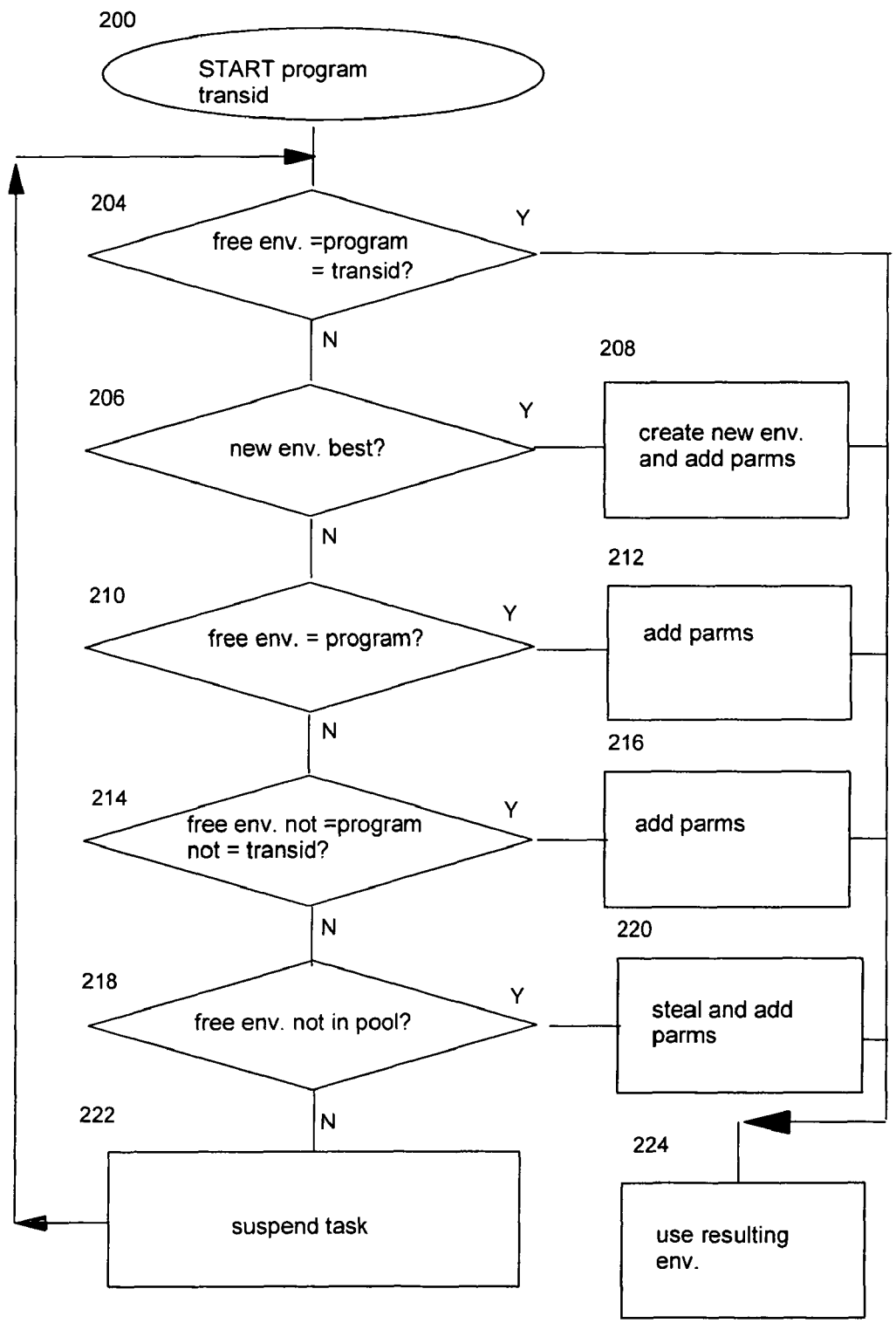
FIG. 2 shows the steps of a method according to a preferred embodiment of the present invention.

In FIG. 2 are shown the steps of a method according to a preferred embodiment of the present invention.

In step (200) a program is initiated and determined to be a Java program object suitable to use a preinitialized environment from a pool. The starting parameter elements may be, for example, as shown in the exemplary drawing, program and transid. The dispatcher tests at step (204) if there is a free environment which matches both the parameter elements program and transid. If there is, that environment will be used at step (224). If there is not, the dispatcher tests at step (206), whether the best response to the situation is to create a new environment. In one embodiment, the test may be based on a maximum size setting for the environment pool. If the maximum size has been reached, it is a best response to attempt to locate a nearly-matching preinitialized environment. Other possible criteria will be evident to those skilled in the art—for example, it may be better in some cases to stall certain program tasks until a free environment becomes available.

If the dispatcher determines that the best response is to create a new environment, it initiates that process at step (208) and causes the required parameter elements to be added to the environment. That environment is then used at step (224). If the dispatcher determines that the creation of a new environment is not the best response, it tests at step (210) for a partially matching environment in the pool. If there is one, it causes the required parameter elements to be added to the environment. That environment is then used at step (224).

If the dispatcher determines that no partially matching environment is available in the pool, it tests at step (214) for a free environment in the pool that does not match at all. If there is one, it causes the required parameter elements which are currently missing from the environment to be added to the environment at step (216). That environment is then used at step (224).

If the dispatcher determines that no free environment is available in the pool, it tests at step (218) for a free environment in another pool. If there is one, the dispatcher at step (220) steals it from that pool and causes the required parameter elements to be added to the environment. That environment is then used at step (224).

In the event of a complete failure to create a new environment or locate a preinitialized environment, the dispatcher at step (222) suspends the program task, and at the end of the suspension period, returns to the beginning of the process to begin to retry the process from step (204).

It will thus be clear to one skilled in the art that, over a period of time running a workload, the pooled environments will "learn" the characteristics of the workload's program tasks. At some point, the number of environments may need to be trimmed to remove environments that can be taken to be no longer needed. In one embodiment of the present invention, it is possible to use a least-recently-used algorithm to decide to remove what may be environments that are no longer needed. Those skilled in the art will recognise that other methods of deciding which environments are no longer needed may be used. One example would be the use of frequency counts, which are well known in the art. If a single program task is instantiated very frequently, its preinitialized environments will most likely remain available in the pool. In an embodiment having a least-recently-used algorithm controlling the trimming of environments, if a task is infrequently run, its preinitialized environments will most likely be purged so that they do not remain available in the pool. As the characteristics of the program tasks in a workload change over time, so will the content of the pool tend to modify itself to match, by a kind of Darwinian evolution, in which the environments that are best modified to satisfy the requirements of the program tasks in the workload will survive.

The present invention is preferably embodied as a computer program product for use with a computer system. Such an implementation may comprise a series of computer readable instructions either fixed on a tangible medium, such as a computer readable medium, e.g., diskette, CD-ROM, ROM, or hard disk, or transmittable to a computer system, via a modem or other interface device, over either a tangible medium, including but not limited to optical or analog communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, e.g., shrink wrapped software, pre-loaded with a computer system, e.g., on a system ROM or fixed disk, or distributed from a server or electronic bulletin board over a network, e.g., the Internet or World Wide Web.

What is claimed is:

1. A method for progressively improving a fit of a pool of reusable environments to requirements of programs in a computer system, the method comprising steps of:
   providing a first environment for a first program;
   responsive to initiation of a second program, making a determination whether creation of a new environment is a best response;
   responsive to a determination that creation of a new environment is a best response, creating a new environment for the second program;
   responsive to a determination that creating a new environment is not a best response, testing the pool for a best fit environment; and
   adding elements to the best fit environment to match requirements of the second program, unless the best fit environment already matches the requirements of the second program;
   wherein the step of responsive to initiation of a second program, making a determination whether creation of a new environment is a best response comprises testing whether the pool has reached a maximum size.

2. The method of claim 1, wherein the step of responsive to a determination that the pool has reached its maximum size, testing the pool for a best fit environment comprises a programmatically alterable test.

3. A computer system for progressively improving a fit of a pool of reusable environments to requirements of programs in a computer system, the computer system comprising:
   means for providing a first environment for a first program;
   means responsive to initiation of a second program, for making a determination whether creation of a new environment is a best response;
   means responsive to a determination that creation of a new environment is a best response, for creating a new environment for the second program;
   means responsive to a determination that creating a new environment is not a best response, for testing the pool for a best fit environment; and
   means for adding elements to the best fit environment to match requirements of the second program, unless the best fit environment already matches the requirements of the second program.

4. The computer system of claim 3, wherein at least one of the first, new and best fit environments is an execution environment.

5. The computer system of claim 4, wherein the execution environment is preinitialized.

6. The computer system of claim 3, wherein at least one of the first, new and best fit environments is eligible to be deleted.

7. The computer system of claim 6, wherein at least one least recently used of the first, new and best fit environments is eligible to be deleted.

8. The computer system of claim 3, wherein the elements are parameters of at least one of the first, the new and the best fit environments.

9. The computer system of claim 3, wherein the means responsive to initiation of a second program, for making a determination whether creation of a new environment is a best response comprises means for testing whether the pool has reached a maximum size.

10. The computer system of claim 9, wherein the means, responsive to a determination that the pool has reached its maximum size, for testing the pool for a best fit environment comprises means for performing a programmatically alterable test.

* * * * *